3,483,004
EDIBLE MEAT COATING COMPOSITION
Clifford D. Bauer, St. Louis, Mo., and Gerald L. Neuser and Hamilton A. Pinkalla, Milwaukee, Wis., assignors to W. R. Grace & Co., New York, N.Y., a corporation of Connecticut
No Drawing. Filed Jan. 25, 1967, Ser. No. 611,553
The portion of the term of the patent subsequent to Oct. 15, 1985, has been disclaimed
Int. Cl. A23b 1/10
U.S. Cl. 99—169          1 Claim

ABSTRACT OF THE DISCLOSURE

An edible meat coating composition which comprises a water-in-oil emulsion the aqueous phase of which contains an edible water soluble gum.

---

The present invention relates to novel meat coating compositions, and more specifically to improved edible meat coating compositions and meat products coated therewith.

It is generally known that a wide variety of meat products may be advantageously coated with edible compositions which contain fat or water, and seasoning agents. These coatings frequently perform the function of protecting the meat from dehydration during storage and also for providing desirable flavoring components during cooking.

Prior art coating compositions frequently are limited in their effectiveness in that they tend to liquify and run off at cooking temperatures. Obviously this tendency to run off prevents absorption of the flavoring ingredients by the meat product.

It is therefore an object of the present invention to provide an improved edible meat coating composition.

It is another object to provide a meat coating which remains stable and intact at low storage temperatures but which will remain sufficiently viscous as to prevent excessive loss during cooking.

It is a further object to provide a coated meat product which will undergo extended cold storage and will be effectively seasoned upon cooking.

These and still further objects of the present invention will become readily apparent to one skilled in the art from the following detailed description and specific examples.

Broadly, the present invention involves an edible meat coating composition which comprises a water-in-oil emulsion the aqueous phase of which contains an edible water soluble gum.

More specifically we have found that a relatively low proportion of a thermal gelling water soluble gum, such as methylcellulose, when contained in the water phase of a water-in-oil emulsion produces the unexpected result of forming a coherent gelatinized matrix from the coating when heated during the cooking to temperatures in the neighborhood of 160–200° F. This phenomenon of thermal gelation retards the loss of coating composition during cooking and increases the absorption of the coating product during the cooking process.

The present coating compositions contain two primary ingredients:

The first is a water-in-oil emulsion which possesses a preferred composition hereinafter given; and the second is any water soluble gum which possesses the characteristic of thermal gelation during heating at cooking temperatures. Optional, but preferred, ingredients include seasoning and/or preserving ingredients for imparting desired flavor and stability to the coating composition.

Typical and particularly preferred water-in-oil emulsions used in the practice of the present invention are generally disclosed in U.S. Patent 3,223,532 dated Dec. 14, 1965 to Pinkalla et al. However, in the broadest sense the present water-in-oil emulsions may be described as containing fat, emulsifiers and water in certain ratios which provide a stable water-in-oil emulsion. Generally speaking, the present emulsions contain from about 6 to 98 parts by weight of fat, 2 to 74 parts by weight of water, and from about 0.1 to 22% by weight of said fat consisting of an emulsifier system which comprises: (1) from about 1 to 12 parts by weight of compatible non-ionic hydrophilic and lipophilic emulsifiers which yield a hydrophilic and lipophilic balance of about 3 to 6 as defined by Becher ACS Monograph 135, 1956; and (2) from about 0.0 to 10 parts by weight of an edible wax. Furthermore, the ratio of the hydrophilic to the lipophilic emulsifiers can range from about 0 to 75% by weight hydrophilic emulsifier and from 100 to 25% by weight of lipophilic emulsifier depending upon the emulsifier system being used. The primary lipophilic emulsifier when speaking of monoglycerides should have an iodine value of about 8 or above.

In the above definition of the emulsion, it is seen that the amounts of the emulsifier composition included are considered to be a part of the total fat constituent. For example, should an emulsion contain 60 parts by weight total fat and 40 parts by weight water, and it is also intended that 7% by weight emulsifying composition is to be added; the weight of the emulsifying composition will be 7% × 60 = 4.2 parts by weight. Furthermore, since the emulsifying composition ingredient is considered to be part of the total fat, the amount of fat necessary to complete the composition will be 60 − 4.2 = 55.8 parts by weight.

Fats used in the preparation of the present emulsion comprise any edible fat of animal or vegetable origin. Typically, these fats include oils derived from plants such as corn oil, cottonseed oil, safflower seed oil, soybean oil, and so forth. Typical animal derived fats which may be used are chicken fat, beef fat and pork fat and modified (hydrogenated etc.) forms thereof.

Both fat and water compatible coloring agents such as B-carotene and various color lakes or water soluble dyes may also be combined with the present compositions.

The emulsifiers which may be used in the practice of the present invention are generally defined as edible non-ionic hydrophilic and lipophilic emulsifiers having a total hydrophilic lipophilic balance (HLB) of from about 3 to 6. Typical examples of hydrophilic emulsifiers which may be used are described in Table I below.

TABLE I
[Tested with lipophilic emulsifier, Myverol 18-71E]

| Chemical name | HLB | °F. or °C. (M.P.) | Iodine value | Aver. purity, percent | Trade name |
|---|---|---|---|---|---|
| Lecithin (O/W type) | | Soft plastic | 90–95 | 60.0 | Centrophil S.M. |
| Polyethylene glycol 400 Monooleate. | 11.0 | <2 C | 31–40 | 100.0 | S1802. |
| Acetylated tartrated monoglyceride of veg. oil. | 12.0 | Liq. at room temp. | 45–55 | 8.5 | Drewmulse A.T.M.G. |
| Do | 12.0 | 130 F | 5 | 20.0 | TEM 4H. |
| Polyoxyethylene (20) sorbitan monosterate. | 14.9 | Liq. at room temp. | 1.5 | 100.0 | Glycosperse S20. |
| Do | 14.9 | do | 1.5 | 100.0 | Tween 60. |
| Acetylated tartrated glyceryl monosterate. | 15.0 | 131 F | 3 max. | 30.0 | Drewmulse ATMS Spec. |
| Do | 15.0 | 136 F | 3 max. | 40.0 | Gloss-Add. |
| Do | 15.0 | Soft paste room temp. | 60 | 20.0 | TEM 4C |
| Polyoxyethylene(20) sorbitan monooleate. | 15.0 | Liq. at room temp. | 19–22 | 100.0 | Glycosperse 020. |

Typical examples of primary lipophilic emulsifiers are given in Table II below.

TABLE II
[Tested with hydrophilic emulsifier, Drewmulse ATMS Spec]

| Chemical name | HLB | °F. or °C. (M.P.) | Iodine value | Aver. purity, percent | Trade name |
|---|---|---|---|---|---|
| Lecithin (W/O type) | | Liq. at room temp. | 90–95 | 4.0 | Centrophil IP. |
| Glyceryl monooleate | 3.4 | 65 F | 70–80 | 42.5 | S1096. |
| Glyceryl monooleate from veg. fat. | 3.5 | 118 F | 65–75 | 42.5 | GMV soft. |
| Glyceryl monooleate f. cottonseed oil. | 3.5 | 110 F | 80–90 | 42.5 | GMC soft. |
| Glyceryl monooleate f. coconut oil. | 3.5 | 90 F | [1] 6–10 | 52.5 | GM-CNO. |
| Glyceryl monooleate f. peanut oil. | 3.5 | 49 C | 80–90 | 42.5 | GM-PNO. |
| Glyceryl monooleate | 3.5 | Liq at 68 F | 80–95 | 42.5 | GMO. |
| Do | 3.5 | Liq at 25° C | 74–78 | 56.5 | Atmos 300. |
| Do | 3.5 | 98 F | 65–70 | 90 min. | Myverol 18-71E. |
| Glyceryl monooleate (18%) and glyceryl monolinoeate (74%). | 3.8 | 102–108 F | 110–120 | | Myverol 18-98. |
| Glyceryl monosterate | 3.8 | 115–122 F | 54–64 | 42.0 | Atmul 80. |
| Do | 3.8 | 125–127 F | 54–61 | 67.0 | Atmul 122. |
| Glyceryl monooleate | 5.2 | 17 C | 65–75 | 38.0 | Aldo MO. |
| Propylene glycol sterate | 5.4 | 43–46° C | <7 | 100.0 | Pegosperse PS. |

[1] Ave.

In addition to the lipophilic emulsifiers listed in Table II above, it is also contemplated that secondary lipophilic emulsifiers, generally described in the prior art as lipophilic "thinners" may be utilized in conjunction with the primary emulsifiers. Numerous examples of these lipophilic thinners are set forth in Table III below.

may be employed as prime lipophilic emulsifiers in producing w/o emulsions while all saturated monoglycerides of iodine value below 8 are useful only as thinners and cannot be used as primary emulsifiers. We have found that we may replace up to 30% of the lipophilic w/o forming emulsifiers of Table II by the lipophilic thinners of Table III.

The emulsifier system utilized in the practice of the present invention also contains an edible wax. Edible waxes which may be utilized in the practice of the present

TABLE III
[Tested with hydrophilic emulsifier, Drewmulse AMTS Spec. and lipophilic emulsifier, Myverol 18-71E]

| Chemical name | HLB | °F. or °C. (M.P.) | Iodine value | Aver. purity, percent | Trade name |
|---|---|---|---|---|---|
| Mono and diglycerides of edible fats and oils. | 3.5 | 135–142 F | <2 | 54.0 | Atmos 150. |
| Glyceryl monosterate | 3.6 | 134.6–141.8 F | <5 | 42.5 | Aldo 33. |
| Do | 3.8 | 138–142 F | <8 max. | 42.0 | Atmul 84K. |
| Do | 3.8 | 140 F | 3 max. | 42.5 | GMS-V hard-SE. |
| Glyceryl lactopalmitate | 4.0 | 140 F | 2 max. | 12.0 | GLP-12. |
| Glyceryl lactosterate | 4.0 | 140 F | 2 max. | 12.0 | GLS-12. |
| Do | 4.0 | 140 F | <5 max. | 12.0 | SL 101. |
| Sorbitan monosterate | 4.7 | 122 F | 2½ | 100.0 | Glycomul S. |
| Do | 4.7 | 122 F | 5 | 100.0 | Span 60. |
| Glyceryl monosterate | 5.8 | 132.8–141.8 F | <5 | 39.0 | Aldo 28. |

It will be seen that, even though the above tables each include compounds having the same chemical name, the compounds are not chemically the same due to the different sources from which they are derived and differences in their manufacture. All hydrophilic emulsifiers in Table I have a hydrophilic-lipophilic balance (HLB) of 7.8 or more while the lipophilics in Table II have a hydrophilic-lipophilic balance of 5.4 or less, and that the iodine values for compounds of the same name vary widely.

Referring to Tables II and III, monoglycerides of iodine value of about 8 or above or mixtures of such compounds, invention are vegetable or animal waxes such as beeswax, candelilla and carnauba.

To prepare the present water-in-oil emulsions, it is generally preferred to first prepare a blend of the liquified fat or oil and wax and the emulsifiers. This blend is usually brought to a liquid condition by heating to temperatures as required by the melting points of the components. This is normally about 60° to 90° C. Subsequent to preparing a homogeneous blend of liquified fat and any oil flavoring or stabilizing agents which may be added to the composition, the water and any water soluble additives included therein, is added to the blended oil emulsifier composition and agitation is continued until a uniform emulsion results. Generally, during the addition of the water the rate of addition is regulated so that all the water is emulsified as it is added. This procedure aids in obtaining a uniform dispersion of water droplets throughout the continuous oil phase.

The water soluble gum preferably used in the practice of the present invention is methyl cellulose. In general it is found that from about 0.3 to about 2.0 parts by weight methyl cellulose per 100 parts by weight of emulsion will provide the desired increase in high temperature gelled strength. Methyl cellulose used in the practice of the present invention may be of either the high or low viscosity types which possess viscosities in the range of from about 100 to 4000 centipoises in 2% water solution at 20° C. It is generally found that the higher viscosity methyl cellulose products are preferred in view of the fact they impart greater increase in high temperature gel strength by weight of product used. However, it is also contemplated that low viscosity types may be appropriately adapted for use in the present invention by merely increasing the concentration to the upper limits described above. In general, the specific type of methyl cellulose used will primarily be an economic consideration and as indicated above may be of either the high or low viscosity type.

The methyl cellulose component is preferably added to the water component of the emulsion, at a temperature above about 105° F., before the emulsion is formed.

The present coating compositions preferably include seasoning agents and/or preservative agents which provide the desired degree and type of seasoning upon final cooking of the coated product. Typical seasonings which may be incorporated in the present compositions include salt, dehydrated onion, pepper, nutmeg, protein hydrolysates and autolysates, sugar, tomato puree, apple juice and so forth. In addition, preservative agents such as sorbic acid and/or benzoic acid and salts may be included. In general, it is found that the combined weight of the seasoning or preservative agents added to the aforedefined emulsion-methyl cellulose compositions range from about 0 to 77 parts by weight. However, this ratio is not particularly critical and practically any range of seasoning additive may be utilized so long as the desired water-in-oil emulsion is maintained.

Meat products which may be coated with the present composition include practically all types of edible proteinaceous materials. Typical examples are various cuts of pork, beef, chicken, as well as comminuted meat and sausage type products obtained therefrom. Furthermore, it is contemplated that various fish products, such as fish, shrimp, clams, oysters and so forth may be advantageously coated. It is also contemplated that various synthetic meat products prepared from plant protein or regenerated animal protein may be advantageously coated and/or combined with the coatings contemplated herein.

The present coating compositions are uniformly applied to frozen meat products by any convenient means such as dipping or spraying the present compositions thereon. Typically a frozen or substantially frozen piece of meat, which may be totally raw or partially cooked and even thoroughly precooked, may be dipped into a liquid body of the present coating composition. The thickness of the coating of the meat will depend upon the viscosity at the applied temperature, the temperature of the meat and the immersion time of the meat in the coating. Ordinarily it is generally preferred to coat the product with a thickness of from about 0.01 to about 0.10 inch; however, it is contemplated that substantially thicker coatings may be applied if desired. For example, in some instances it may be desired to inbed the meat in a solid block of the present coating.

Frozen meat pieces which are to be coated with the present product are advantageously maintained at a temperature of from about 0° F. to 60° F. When the meat being coated is maintained at this temperature the temperature of the coating composition is generally maintained in liquid state at a temperature preferably in the range of from about 80 to 120° F., whereat the composition is fluid but not sufficiently warm to cause undue thawing of the meat surface and sufficient temperature differential exists to create the required chilling of the liquid emulsion upon the meat. The liquid emulsions which contain wax generally may be maintained in a quiescent state during application. However, these emulsion compositions which do not contain wax are preferably maintained under agitation during the application procedure, so as to keep the emulsion in the preferred uniform condition.

The meat products coated in accordance with the present invention are capable of undergoing extended storage periods without undergoing any substantial dehydration. Storage temperatures on the order of from about 0° F. to about −50° F. are normally sufficient to maintain the present coating in a continuous and uniform state throughout the storage.

As indicated above, the meat products coated in accordance with the present invention may be completely raw, partially cooked or completely cooked prior to coating. The present coated product is prepared for eating merely by heating the product to the desired cooking/eating temperature which is normally in the range of 160 to 180° F. Obviously, the degree of heating required will of course depend upon the initial degree of cooking which the initial coated product has undergone and the preferences of the consumer involved.

Having described the basic embodiments of the present invention the following examples are given to illustrate specific practices thereof.

EXAMPLE I

A poultry seasoning coating was prepared from the following ingredients:

| Ingredient | Percent by weight |
|---|---|
| Beeswax, natural | 1.410 |
| Vegetable oil | 35.625 |
| Glyceryl monooleate (Myverol 18–25) | 1.410 |
| Water | 37.749 |
| Protein autolysate (Bio-Sol 15530) | 13.250 |
| Poultry seasoning spice mixture | .531 |
| Dehydrated onion powder | .812 |
| Sucrose | 8.000 |
| Dehydrated parsley | .125 |
| Sorbic acid | .100 |
| Sodium benzoate | .100 |
| Methylcellulose, Methocel MC 4000 cps | .538 |
| Tartaric acid, 20% solution | .350 |
| Color as desired. | |

The vegetable oil, beeswax and monoglyceride were uniformly mixed in a separate container. Then the remainder of the ingredients were added to the water component at 115° F. and thoroughly admixed in another container. The liquified fat mixture was then cooled to 115° F. and maintained in the bowl of a planetary mixer fitted with a wire whip. The aqueous phase was heated to 115° F. and was added in a small stream to the fat phase with continuous mixing. The mixing was continued for ten minutes subsequent to the complete addition of the water phase. During the mixing operation the mixture was permitted to cool to about 85° F.

The above mixture was maintained at 105° F. and pieces of chicken were dipped therein. A smooth uniform coating was obtained which comprised approximately 12% of the weight of the coated meat product. The emulsion hardened to a relatively non-greasy coating in 10 to 15 seconds. Upon cooking the frozen coated pieces at a temperature above 160° F. it was observed that the coating was retained upon the chicken parts.

EXAMPLE II

A pork seasoning coating was prepared from the following ingredients:

| | Percent by weight |
|---|---|
| Vegetable oil | 33.50 |
| Beeswax, natural | 1.40 |
| Glyceryl monooleate | 1.40 |
| Apple juice | 56.80 |
| Dehydrated onion | .50 |
| Protein, autolysate (Bio-Sol 15530) | 5.26 |
| Pepper | .05 |
| Salt | .03 |
| Nutmeg | .06 |
| Sorbic acid | .10 |
| Sodium benzoate | .10 |
| Methylcellulose, Methocel MC, 4000 cps | .80 |

The above ingredients were admixed in a manner similar to that set forth in Example I. Frozen pork chops were dipped into the above emulsion which was maintained at a temperature of about 105° F. A coating of approximately 1/16 inch in thickness was obtained which comprised approximately 18% by weight of the coated product. The frozen coated pieces after cooking in foil for 90 min. at 425° F. were found to possess superiod eating qualities.

EXAMPLE III

A barbeque coating was prepared from the following ingredients:

| | Percent by weight |
|---|---|
| Vegetable oil | 35.625 |
| Beeswax | 1.410 |
| Glyceryl monooleate (Myverol 18-85) | 1.410 |
| Barbeque sauce | 31.250 |
| Tomato juice | 18.750 |
| Protein autolysate (Bio-Sol 15530) | 7.812 |
| Dehydrated onion | .625 |
| Worcestershire sauce | .125 |
| Corn syrup | 2.190 |
| Chili powder | .125 |
| Sorbic acid | .100 |
| Sodium benzoate | .100 |
| Methylcellulose, Methocel MC 4000 cps. | 1.000 |

The above ingredients were admixed in a manner set forth in Example I.

The above composition was applied to beef pieces by dipping frozen meat pieces in the above emulsion which was maintained at 105° F. A smooth uniform coating which comprises 15 to 18% by weight of the coated meat product was obtained. The frozen coated pieces after cooking in an oven showed good retention of coating and an enhanced flavor and juiciness.

The above examples clearly illustrate that an improved meat coating product may be obtained using the teachings of the present invention.

We claim:
1. An edible meat coating which comprises:
   (A) a water-in-oil emulsion, which emulsion comprises:
       (1) from about 6 to 98 parts by weight fat,
       (2) from about 2 to 74 parts by weight water, and
       (3) from about 0.1 to about 22% by weight of said fat consisting of an emulsifying composition containing
           (a) from about 1 to 12 parts by weight of an edible non-ionic hydrophilic and lipophilic emulsifier having an HLB of from about 3 to 6, said hydrophilic emulsifier being present in amounts ranging from about 0 to 75% by weight of the emulsifier composition, said lipophilic emulsifier being present in amounts varying from about 100 to 25% by weight of the emulsifier composition, the lipophilic emulsifier having an iodine value of greater than about 8 and
           (b) from about 0 to about 10 parts by weight of edible wax; and
   (B) from about 0.3 to about 2.0 parts by weight of methyl cellulose per 100 parts by weight of said emulsion, said methyl cellulose having a viscosity of from about 100 to about 4000 centipoises in 2% water solution at 20° C.

References Cited

UNITED STATES PATENTS

| 3,266,909 | 8/1966 | Ellis | 99—169 |
| 3,406,081 | 10/1968 | Bauer et al. | 99—194 |

HYMAN LORD, Primary Examiner

U.S. Cl. X.R.

99—107, 111, 194, 195